United States Patent
Cai et al.

(10) Patent No.: US 8,483,624 B2
(45) Date of Patent: Jul. 9, 2013

(54) SYSTEM AND METHOD FOR DRX CONTROL AND NACK/ACK

(75) Inventors: Zhijun Cai, Euless, TX (US); James Earl Womack, Bedford, TX (US)

(73) Assignee: Research In Motion Limited, Waterloo, Ontario (CA)

( * ) Notice: Subject to any disclaimer, the term of this patent is extended or adjusted under 35 U.S.C. 154(b) by 940 days.

(21) Appl. No.: 12/193,991

(22) Filed: Aug. 19, 2008

(65) Prior Publication Data

US 2009/0054006 A1    Feb. 26, 2009

Related U.S. Application Data

(60) Provisional application No. 60/956,845, filed on Aug. 20, 2007, provisional application No. 60/974,653, filed on Sep. 24, 2007.

(51) Int. Cl.
*H04B 1/38* (2006.01)

(52) U.S. Cl.
USPC ............. 455/73; 370/311; 370/329; 370/473; 340/7.32; 375/260

(58) Field of Classification Search
USPC .................... 455/574, 73; 370/252, 321, 328, 370/349, 473, 458; 714/748; 340/7.32
See application file for complete search history.

(56) References Cited

U.S. PATENT DOCUMENTS

| | | | |
|---|---|---|---|
| 6,973,052 B2 | 12/2005 | Wang et al. | |
| 6,975,629 B2 | 12/2005 | Welin | |
| 7,027,400 B2 | 4/2006 | O'Neill | |
| 7,221,945 B2 | 5/2007 | Milford et al. | |
| 7,372,818 B2 * | 5/2008 | Fraser et al. | 370/252 |
| 7,596,366 B2 * | 9/2009 | Van Bosch et al. | 455/343.2 |
| 7,899,003 B2 * | 3/2011 | Xu | 370/321 |
| 7,995,661 B2 * | 8/2011 | Xu et al. | 375/260 |

(Continued)

FOREIGN PATENT DOCUMENTS

| | | |
|---|---|---|
| CA | 2344911 A1 | 12/2001 |
| EP | 0529269 A2 | 3/1993 |

(Continued)

OTHER PUBLICATIONS

Research in Motion Limited: "Semi-persistent Scheduling and DRX Control" 3GPP Draft; R2-073245, 3rd Generation Partnership Project (3GPP), Mobile Competence Centre ; 650, Route Des Lucioles ; F-06921 Sophia-Antipolis Cedex ; France, vol. tsg_ran\WG2_RL2\TSGR2_59\Docs, no. Athens, Greece; 20070820, Aug. 13, 2007, XP050135972.

(Continued)

*Primary Examiner* — April G Gonzales
(74) *Attorney, Agent, or Firm* — Finnegan, Henderson, Farabow, Garrett & Dunner LLP

(57) ABSTRACT

Methods of combining semi-persistent resource allocation and dynamic resource allocation are provided. Packets, such as VoIP packets, are transmitted on the uplink and downlink using respective semi-persistent resources. For each mobile device, awake periods and sleep periods are defined. The semi-persistent resources are aligned with the awake periods so that most of the time the mobile device can turn off its wireless access radio during the sleep periods. In addition, signalling to request, and to allocate, resources for additional packets are transmitted during the awake periods, and the resources allocated for the additional packets are within the awake windows.

6 Claims, 14 Drawing Sheets

U.S. PATENT DOCUMENTS

| | | | |
|---|---|---|---|
| 2003/0157887 A1 | 8/2003 | Willenegger | |
| 2003/0185162 A1* | 10/2003 | Fraser et al. | 370/311 |
| 2004/0042492 A1* | 3/2004 | Suzuki et al. | 370/473 |
| 2004/0093174 A1 | 5/2004 | Lander | |
| 2004/0185918 A1 | 9/2004 | Fan et al. | |
| 2004/0253996 A1 | 12/2004 | Chen | |
| 2004/0264433 A1 | 12/2004 | Melpignano | |
| 2005/0009578 A1 | 1/2005 | Liu | |
| 2005/0047387 A1 | 3/2005 | Frederiksen et al. | |
| 2005/0063330 A1 | 3/2005 | Lee et al. | |
| 2005/0128998 A1 | 6/2005 | Jelitto et al. | |
| 2005/0135302 A1* | 6/2005 | Wang et al. | 370/329 |
| 2005/0201353 A1 | 9/2005 | Lee et al. | |
| 2005/0254444 A1 | 11/2005 | Meier et al. | |
| 2005/0254459 A1 | 11/2005 | Qian | |
| 2005/0281222 A1 | 12/2005 | Ranta-Aho et al. | |
| 2006/0019641 A1 | 1/2006 | Vayanos et al. | |
| 2006/0252449 A1 | 11/2006 | Ramesh | |
| 2007/0004374 A1 | 1/2007 | Kneckt | |
| 2007/0060167 A1 | 3/2007 | Damnjanovic et al. | |
| 2007/0061433 A1 | 3/2007 | Reynolds et al. | |
| 2007/0082620 A1 | 4/2007 | Zhang et al. | |
| 2007/0087724 A1 | 4/2007 | Jang et al. | |
| 2007/0177630 A1* | 8/2007 | Ranta et al. | 370/473 |
| 2007/0286080 A1 | 12/2007 | Kim et al. | |
| 2007/0291673 A1 | 12/2007 | Demirhan et al. | |
| 2008/0090583 A1 | 4/2008 | Wang et al. | |
| 2008/0101268 A1 | 5/2008 | Sammour et al. | |
| 2008/0117891 A1 | 5/2008 | Damnjanovic et al. | |
| 2008/0167089 A1* | 7/2008 | Suzuki et al. | 455/574 |
| 2008/0181127 A1 | 7/2008 | Terry et al. | |
| 2008/0186944 A1* | 8/2008 | Suzuki et al. | 370/349 |
| 2008/0192703 A1* | 8/2008 | Suzuki | 370/335 |
| 2008/0207229 A1 | 8/2008 | Cave et al. | |
| 2008/0232310 A1 | 9/2008 | Xu | |
| 2008/0267105 A1 | 10/2008 | Wang et al. | |
| 2008/0310333 A1 | 12/2008 | Balachandran et al. | |
| 2008/0311919 A1 | 12/2008 | Whinnett et al. | |
| 2009/0046627 A1* | 2/2009 | Xu | 370/328 |
| 2009/0074090 A1* | 3/2009 | Xu et al. | 375/260 |
| 2009/0180414 A1 | 7/2009 | Maeda et al. | |
| 2009/0186614 A1 | 7/2009 | Aoyama et al. | |
| 2009/0274107 A1 | 11/2009 | Park et al. | |
| 2010/0142485 A1 | 6/2010 | Lee et al. | |
| 2010/0184443 A1 | 7/2010 | Xu | |
| 2010/0309798 A1 | 12/2010 | Fodor et al. | |

FOREIGN PATENT DOCUMENTS

| | | |
|---|---|---|
| EP | 0 924 890 A2 | 6/1999 |
| EP | 1 289 181 A1 | 3/2003 |
| EP | 1317156 A1 | 6/2003 |
| EP | 1450240 A2 | 8/2004 |
| EP | 1 492 263 A1 | 12/2004 |
| KR | 10-2002-0002305 | 1/2002 |
| KR | 10-2001-0080057 | 6/2003 |
| KR | 10-2004-0050422 A | 6/2004 |
| WO | WO 00/21236 | 4/2000 |
| WO | WO 02/33875 A1 | 4/2002 |
| WO | WO 03/096707 A2 | 11/2003 |
| WO | WO 2004/004194 | 1/2004 |
| WO | WO 2005/022772 | 3/2005 |
| WO | WO 2006/002379 | 1/2006 |
| WO | WO 2006/046754 | 5/2006 |
| WO | WO 2006/103498 A1 | 10/2006 |
| WO | 2006/114710 A2 | 11/2006 |
| WO | WO 2007/014021 A2 | 2/2007 |
| WO | WO 2007/025138 A2 | 3/2007 |
| WO | WO 2007/073118 A1 | 6/2007 |
| WO | WO 2007/089797 A2 | 8/2007 |

OTHER PUBLICATIONS

Nokia, Nokia Siemens Networks: "Further considerations on DL semi-persistent scheduling" 3GPP TSG-RAN WG2 Meeting #58, R2-071743, May 7, 2007, pp. 1-3, XP002503687.

European Examination Report dated Feb. 9, 2010 for European Patent Application No. 08162615.2.

Research in Motion Limited, "Semi-persistent Scheduling and DRX Control", 3GPP TSG-RAN-WG2 Meeting # 59, Aug. 2007.

Shun-Ren Yang and Yi-Bing, Lin, "Modeling UMTS Discontinuous Reception Mechanism" IEEE Transactions on Wireless Communications, Jan. 2005, pp. 312-319, vol. 4., No. 1.

Ericsson, Semi Persistent Scheduling, TSG-RAN WG2 Meeting # 55, Oct. 2006.

Ericsson, "Performance Gains of the Semi-Autonomous DRX Scheme for LTE", 3GPP TSG-RAN WG2 Meeting # 58-bis, Jun. 2007.

Nokia, Nokia Siemens Networks, "Further Considerations on DL Semi-Persistent Scheduling", 3 GPP TSG-RAN WG2 Meeting # 58, May 2007.

Jiang, Dajie et al.; Principle and Performance of Semi-Persistent Scheduling for VoIP in LTE System; International Conference on Wireless Communications, Networking and Mobile Computing, 2007 (WiCom 2007), Sep. 21-25, 2007, pp. 2861-2864.

Fukui, N.; Study of Channel Quality Feedback in UMTS HSDPA; Personal, Indoor and Mobile Radio Communications, 2003. PIMRC 2003. 14$^{th}$ IEEE Proceedings on, vol. 1, pp. 336-340, Sep. 7-10, 2003.

Dottling et al.; Efficient Channel Quality Feedback Schemes for Adaptive Modulation and Coding of Packet Data, Vehicular Technology Conference, 2004. VTC2004-Fall. 2004 IEEE 60$^{th}$, vol. 2, pp. 1243-1247, Sep. 26-29, 2004.

Soo-Yong Jeon et al.; Channel Adaptive CQI Reporting Schemes for UMTS High-Speed Downlink Packet Access, Vehicular Technology Conference, 2006. VTC2006-Fall. 2006 IEEE 64$^{th}$, p. 1-5, Sep. 25-28, 2006.

LG Electronics Inc.: Uplink Scheduling for VoIP, 3GPP TSG RAN WG2 # 56, R2-063273, Nov. 6-10, 2006, pp. 1-3, XP002460797, Riga, Latvia.

Samsung; VoIP Support in LTE, 3GPP TSG RAN WG1 Meeting #48, R1-070961, Feb. 12-16, 2007, pp. 1-6, XP002460796, St. Louis, Missouri.

Lucent Technologies; Uplink Scheduling Requests for Real Time Services, 3GPP TSG-RAN2, #54, R2-062227, Aug. 28-Sep. 1, 2006, pp. 1-5, XP002460798.

NTT Docomo, Inc.; Comparison of Persistent Resource Alocation Schemes in LTE Uplink, 3GPP TSG RAN WG2 #56, R2-060283, Jan. 15-19, 2007, pp. 1-5, XP002460799, Riga Latvia.

Alcatel-Lucent; DL Control Signaling and Multiplexing for VoIP, 3GPP TSG RAN WG1 Meeting #48bis, R1-071721, Mar. 26-30, 2007, pp. 1-4, XP002460800, St. Julians, Malta.

NTT Docomo, Inc.; Uplink Resource Allocation Scheme, 3GPP TSG RAN WG2 #54, R2-062164, Aug. 28-Sep. 1, 2006, pp. 1-5, XP002460801, Tallinn, Estonia.

Ericsson et al., "Maximum number of hybrid ARQ processes", TSG-RAN WG1 #50, R1-073871, Aug. 20-24, 2007.

Ericsson, "DRX control for LTE_ACTIVE and VoIP", 3GPP TSG-RAN WG2 Meeting #58, R2-071818, May 7-11, 2007, Kobe, Japan.

Nokia Siemens Networks, "Update on Security, System Information, Mobility, MBMS and DRX", 3GPP TSG-RAN2 Meeting #59, R2-073855, Jun. 20-24, 2007, Athens, Greece.

European Search Report dated Sep. 12, 2007 based on EP 07 10 7587.

European Search Report dated Dec. 20, 2007 based on EP 07 10 8885.

PCT Search Report dated Apr. 17, 2008 based on PCT/CA2007/002368.

PCT Search Report dated Apr. 17, 2008 based on PCT/CA2008/000003.

PCT Search Report dated Mar. 13, 2008 based on PCT/CA2007/002311.

PCT Search Report dated May 21, 2008 based on PCT/CA2007/002299.

PCT Search Report dated Apr. 24, 2008 based on PCT/CA2008/000001.

PCT Search Report dated Aug. 8, 2008 based on PCT/CA2008/000770.

PCT Search Report dated Aug. 1, 2008 based on PCT/CA2008/000771.

PCT Search Report dated Feb. 28, 2009 based on PCT/US2008/073593.

European Search Report dated Dec. 16, 2008 based on EP 08 16 2639.

PCT Search Report dated Feb. 6, 2009 based on PCT/US2008/073585.

European Search Report dated Dec. 16, 2008 based on EP 08 16 2615.

PCT Search Report dated Dec. 26, 2008 based on PCT/US2008/073580.

European Search Report dated Nov. 25, 2008 based on EP 08 162 638.

Ericsson: "DRX and VoIP" 3rd Generation Partnership Project (3GPP), [Online] Aug. 15, 2007, XP050135937 (cited in corresponding European Search Report dated Jun. 5, 2009) Retrieved from the Internet: URL:ftp://ftp.3gpp.org/tsg_ran/WG2_RL2/TSG R2_59/Docs/R2-073208.zip>.

U.S. Office Action dated Mar. 2, 2011 based on U.S. Appl. No. 11/968,518.

U.S. Office Action dated Mar. 1, 2011 based on U.S. Appl. No. 11/969,082.

U.S. Office Action dated Jan. 31, 2011 based on U.S. Appl. No. 11/957,624.

European Summons to Oral Proceedings dated May 10, 2010 issued in European Patent Application No. 08162639.2.

European Communication dated Nov. 5, 2009 issued in European Patent Application No. 08162639.2.

European Communication dated Jun. 15, 2009 issued in European Patent Application No. 08162639.2.

European Decision to Refuse Application dated Feb. 17, 2011 issued in European Patent Application No. 08162639.2.

European Search Report for EP Application No. 11160318.9 dated Jun. 24, 2011.

* cited by examiner

SYSTEM AND METHOD FOR DRX CONTROL AND NACK/ACK

This application claims the benefit of U.S. Provisional Application Ser. No. 60/956,845 filed on Aug. 20, 2007, and U.S. Provisional Application Ser. No. 60/974,653 filed on Sep. 24, 2007 which are incorporated herein by reference in their entirety.

FIELD OF THE INVENTION

The application relates to wireless communication, and more particularly to transmission scheduling for wireless communication.

BACKGROUND

With semi-persistent scheduling, for downlink VoIP (voice over IP (Internet Protocol)) communications to a mobile device, a periodic DL (downlink) transmission resource is allocated during a talk-spurt on the downlink. The same resource is allocated each time. The allocation is turned on during each of the talk-spurts and off between talk-spurts. In this manner, explicit signalling to request an allocation, and to grant a particular VoIP allocation is not required. Semi-persistent scheduling for uplink VoIP communications from a mobile station is similar.

In addition to regular VoIP traffic, mobile devices also need the ability to send and transmit larger IP packets. Such larger IP packets are likely to be relatively infrequent compared to the frequency of regular VoIP transmissions. Such packets might include uncompressed IP packets, RTCP (Remote Transmit Power Control) packets, SIP/SDP (Session Initiation Protocol/Session Description Protocol) packets, etc. Such IP packets may be several hundreds of bytes in size and may have high priority. In addition, larger packets may be required to transmit RRC (Radio Resource Control) Signalling messages. Examples of this are handover related messages such as measurement reports. Some mobile devices will also need the ability to deliver a mixed service in which case services in addition to VoIP need to be provided to the mobile device, such as e-mail, web browsing etc.

BRIEF DESCRIPTION OF THE DRAWINGS

Embodiments will now be described with reference to the attached drawings in which.

DETAILED DESCRIPTION OF EMBODIMENTS

Figure 1:
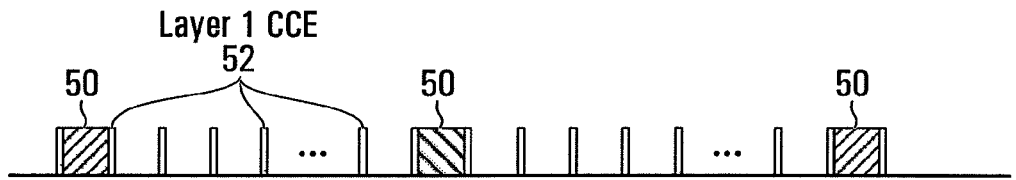
FIG. 1 is a signalling diagram showing dynamic scheduling vs. semi-persistent scheduling.

According to one broad aspect, the application provides a method of receiving acknowledgment (ACK) or negative-acknowledgment (NACK) in a device comprising: configuring the device for discontinuous reception (DRX) having on durations; and receiving ACK or NACK information irrespective of the DRX on durations.

According to another broad aspect, the application provides a method of transmitting acknowledgment (ACK) or negative-acknowledgment (NACK) in a device comprising: configuring the device for discontinuous reception (DRX) having on durations; and transmitting ACK or NACK information irrespective of the DRX on durations.

According to another broad aspect, the application provides a wireless device comprising: a receiver configured for discontinuous reception (DRX) having on durations; and the receiver further configured to receive acknowledgment (ACK) or negative-acknowledgement (NACK) information irrespective of the DRX on durations.

According to another broad aspect, the application provides a wireless device comprising: a receiver configured for discontinuous reception (DRX) having on durations; and a transmitter configured to transmit acknowledgment (ACK) or negative-acknowledgement (NACK) information irrespective of the DRX on durations.

According to another broad aspect, the application provides a method in a wireless device having a radio, the method comprising: controlling the radio to have periods during which the radio is on, and periods during which the radio is off, the periods during which the radio is on having a nominal on duration and the periods during which the radio is off having a nominal off duration; for each period that the radio is on for which there is content to send to the wireless device: receiving a transmission during the period the radio is on; transmitting an acknowledgment (ACK) or negative-acknowledgment (NACK) corresponding to the transmission at a time determined for ACK or NACK transmission, irrespective of nominal on duration and nominal off duration definitions.

Further aspects provide wireless networks, base stations, wireless devices that execute one or more of the methods summarized above or detailed herein. Another embodiment provides a computer readable medium having computer readable instructions for controlling the execution of one or more of the methods summarized above or detailed herein.

Dynamic scheduling has been proposed to allow the dynamic allocation of transmission resources, and the subsequent transmission of a large packet using the dynamically allocated resources. Dynamic scheduling involves allocating a resource each time a packet is to be transmitted, and the resource can differ for each allocation. In a particular example, see Applicant's co-pending U.S. Provisional Patent Application No. 60/944,376 filed on Jun. 15, 2007 and hereby incorporated by reference in its entirety.

In a specific example, a mobile device supporting VoIP with dynamic scheduling monitors layer 1 CCEs (Control Channel Elements) continuously for dynamic scheduling grants even though the mobile device might be only involved in a VoIP session. LTE (Long Term Evolution) refers to CCEs, but the term has more general application to mean simply control information.

As indicated above, a mobile device may support VoIP with dynamic scheduling by monitoring layer 1 CCEs continuously for dynamic scheduling grants. Unfortunately, this might waste battery power for the mobile device, particularly when there are very few or even no dynamic scheduling grants for the mobile device.

Referring now to FIG. 1, shown is a signalling diagram showing dynamic scheduling vs. semi-persistent scheduling. Time is on the horizontal axis. Shown is a periodic semi-persistent allocation 50. For VoIP transmission, this can for example include a resource allocated every 20 ms. In addition, there is a regular set of layer 1 CCEs 52 that are transmitted. In the illustrated example, these are transmitted in every 1 ms but it is to be clearly understood that the other resource allocation periods and CCE periods are possible. This example assumes downlink transmission, but a similar approach applies to uplink transmission. During the periods that occur between talk-spurts, (also referred to as "silence" or "silence periods"), the transmitter and receiver can be turned off. During a talk-spurt period (also referred to as a period that VoIP transmission is "active", or "active mode"), if not for dynamic scheduling, the mobile device could wake up regularly to blind-detect its data in the semi-persistently allocated resource at the pre-defined interval (e.g. every 20 ms) while entering a "sleeping" mode at other times. This can also be referred to as DRX (discontinuous reception). This simply means that the receive capability of the mobile device's radio is basically turned off while the mobile device is in sleep mode thereby resulting in battery life extension. However, given that other data may arrive via dynamic scheduling by any of the CCEs 52, the mobile device needs to monitor the CCEs of all sub-frames. In the full dynamic scheduling case there is no DTX or DRX and this rules out the possibility of using DRX since the mobile device needs to continue monitoring the layer 1 CCEs for dynamic scheduling grants for possible data coming. This is not power efficient and leads to lower battery charge lifetimes.

To efficiently support the DRX in VoIP active mode in order to reduce the battery power consumption, systems and methods are provided for combining semi-persistent scheduling for VoIP with a scheduling capability for additional packet transmission. These methods are particularly effective for a mobile device that is only involved in a VoIP session (i.e. not requiring mixed service).

System for Semi-Persistent Scheduling and DRX Control

Figure 2:
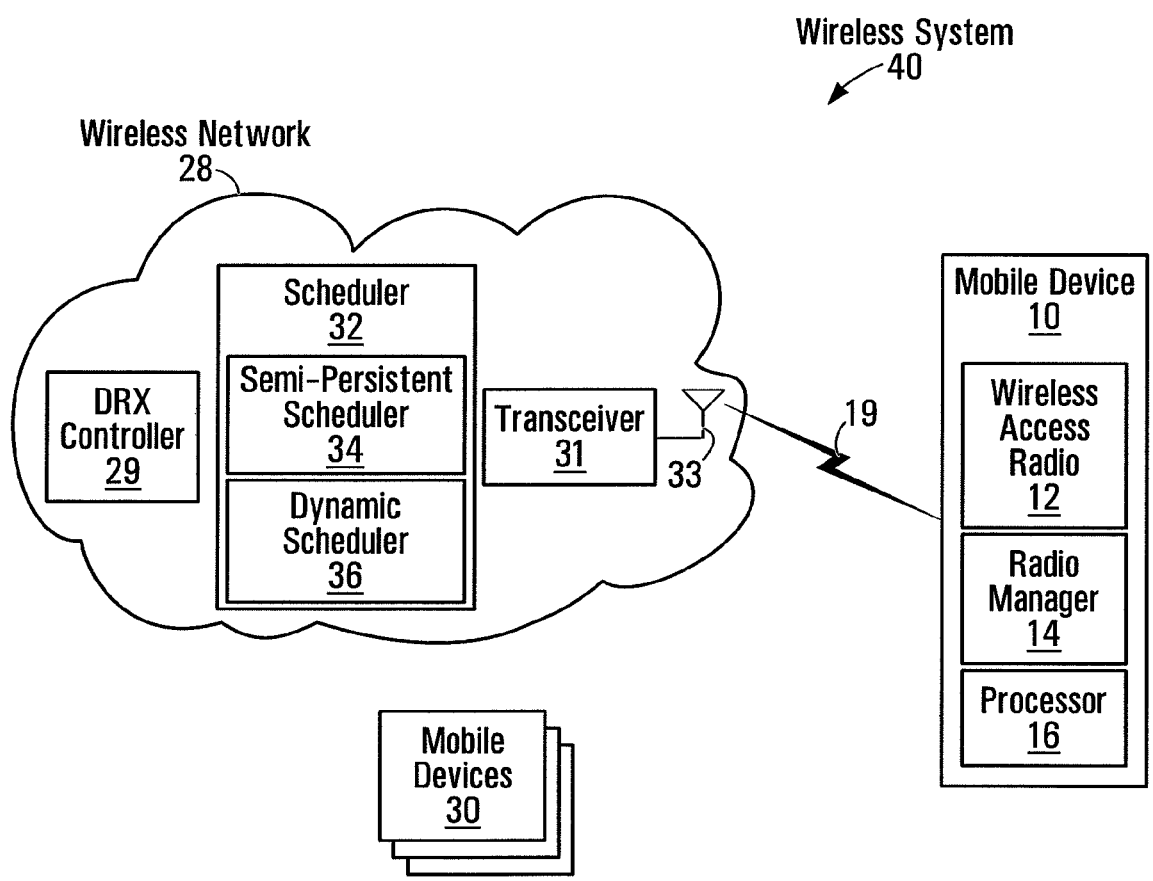
FIG. 2 is a block diagram of an example wireless system.

Referring now to FIG. 2, shown is a block diagram of an example wireless system 40. The wireless system 40 has a wireless network 28 and a mobile device 10. The wireless system also has other mobile devices 30.

The mobile device 10 has a wireless access radio 12, a processor 16 and a radio manager 14 that is responsible for controlling the wireless access radio 12. There may be additional components not shown. The radio manager 14 may be implemented in software running on appropriate hardware, hardware, firmware or combinations thereof. In some embodiments, the radio manager 14 performs DRX control as described herein, and may also perform radio resource control and radio resource management. For example, the radio manager may perform one or more of radio resource assignment, radio bearer control, radio related signaling, mobility, measurement, paging, among other functions.

The wireless network 28 has a scheduler 32 that encompasses a semi-persistent scheduler 34 and a dynamic scheduler 36. The wireless network 28 has components such as base stations (not shown) for providing wireless access. These include a transceiver 31 having at least one antenna 33. The scheduler 32 may reside in a base station or elsewhere in the network 28. In LTE, the scheduler is typically in the eNB (enhanced NodeB). In the examples that follow, it is assumed that scheduler 32, transceiver 31 and antenna 33 are all parts of a base station. Also shown is a DRX controller 29 that is responsible for setting up/configuring/obtaining knowledge of the DRX behaviour for each mobile device. The DRX controller 29 may be part of a base station and may be implemented in software running on appropriate hardware, hardware, firmware or combinations thereof.

Furthermore, it is to be understood that the wireless network would have any appropriate components suitable for a wireless network 28. Note that the wireless network may include wires that interconnect network components in addition to components for providing wireless communication with mobile devices. The components of the wireless network are implementation specific and may depend on the type of wireless network. There are many possibilities for the wireless network. The wireless network might for example be a UMTS network or any cellular network that uses semi-persistent resource assignment.

In operation, the mobile device 10 communicates with the wireless network 28 over a wireless connection 19 between the mobile device 10 and the wireless network 28. The communication with the wireless network 28 includes VoIP packet transmission and additional packet transmission. The semi-persistent scheduler 34 is responsible for making an initial resource allocation for a VoIP service to the mobile device 10. This includes an uplink semi-persistent allocation and a downlink semi-persistent allocation. The semi-persistent scheduler 34 is also responsible for keeping track of whether there is a talk-spurt in progress for the uplink and/or the downlink and for turning on and off the uplink and/or downlink allocation accordingly. While de-allocated, the semi-persistently allocated resources can be made available for other purposes. Note that the form of the transmission resources that are being allocated is implementation specific. Particular examples of resources that might be used include OFDM resources and CDMA resources. The dynamic scheduler 36 is responsible for making resource allocations for additional packet transmissions that are not accommodated by the semi-persistent allocation. The additional packets may be related to and/or form part of the VoIP service, or be unrelated to the VoIP service.

The radio manager 14 controls the on/off state of the wireless access radio 12. In some wireless access radios, the transmitter and receiver must be turned on and off together, and as such, uplink and downlink scheduling must be coordinated to allow the wireless access radio to be turned off. In some wireless access radios, receive and transmit capabilities can be independently turned off.

In some embodiments, the network 28 sends DRX control signalling to the mobile device 10 that sets a repeating pattern that has a DRX period having an awake period and a sleep period. An example could be: DRX period is 20 ms with sleep period equal to 15 ms and awake period equal to 5 ms. During the awake period, the mobile device turns its receiver on. During the sleep period, the mobile device turns its receiver off. This signalling might be sent at the start of each VoIP session, for example. In some embodiments, the DRX controller 29 transmits DRX control parameters to the mobile device to set up DRX control. In some embodiments, the control signalling includes information defining how to control the radio for the purpose of ACK/NACK transmission. Specific examples are provided below under the heading "DRX Control and NACK/ACK". This signalling may indicate for example a duration of an extension to a period of nominal on duration that is to be used when an ACK/NACK is expected to be required (transmitted or received), or an indication of extra on periods that are utilized only when there is a need for an ACK/NACK.

In some embodiments, in addition to the above-discussed DRX control functions, the DRX controller 29 performs radio resource control and radio resource management, which take care of one or more of radio resource assignment/release/reassignment, radio bearer control, admission control, radio related signaling, mobility, measurement, and paging, to name a few specific examples.

Figure 3:
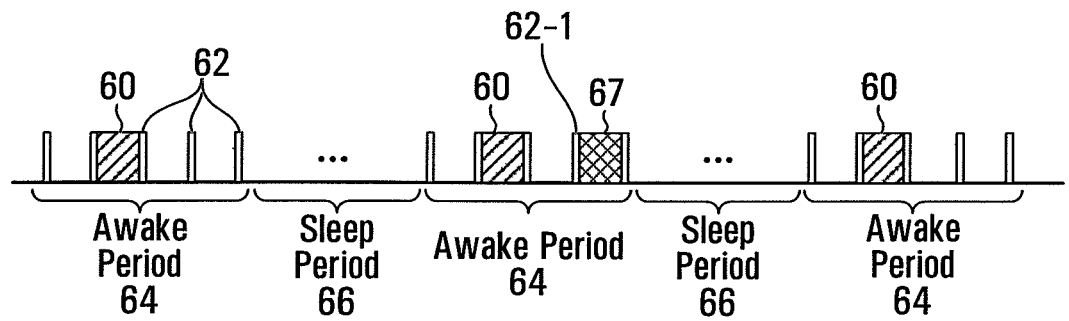
FIG. 3 is a signalling diagram showing an awake period for dynamic scheduling in DRX (discontinuous reception)

Referring now to FIG. 3, shown is a signalling diagram showing an example of semi-persistent and dynamic scheduling and DRX. Shown is a semi-persistent allocation 60 available for semi-persistent VoIP DL transmissions. In addition, there are layer 1 CCEs 62 for signalling dynamic allocations so as to allow the transmission of additional packets. This represents the transmissions from the base station. The mobile device receiving the transmissions alternates between being in an awake state and a sleep state. The mobile station is in an awake state during awake periods 64 and the mobile device is nominally in a sleep state during sleep periods 66. The first thing that the scheduler in the network needs to do is to ensure that the semi-persistent allocation 60 coincides with the awake periods 64. In addition, each awake period 64 is longer than the minimum necessary to transmit the VoIP semi-persistent allocation. There is also the opportunity to dynamically schedule (as signalled on one of the CCEs 62) and transmit an additional packet. An example of this is shown where a dynamic allocation is signalled in CCE 62-1. Additional packet 67 is shown transmitted immediately following CCE 62-1. The additional packet might for example be an RTCP packet, SIP/SDP packet, or a packet that has not undergone IP\UDP\RTP header compression, etc. While the mobile device is in the sleep state, it operates in a reduced power consumption mode, by turning off reception capability and/or by turning off its reception and transmission capabilities. In this example, the network has scheduled the additional packet 67 to be transmitted during one of the awake periods 64, and signals this using a CCE 62-1 that is transmitted during one of the awake periods 64. More generally, when the mobile device wakes up after a sleep period, the mobile device will not only blind detect its own VoIP data on the semi-persistently allocated resource 60, but also will detect, more generally attempt to detect, all the CCEs during the awake periods.

In some embodiments, after the mobile device determines that there will be a dynamically allocated resource for the mobile device as signalled in one of the CCEs in a given awake period, the mobile device does not monitor further CCEs during that awake period.

In some embodiments, the base station will transmit signalling to configure the mobile device with this DRX behaviour, and thereafter all the dynamic scheduling will occur only in this "awake period". For example, the mobile device may sleep every 15 ms, and then wake up for 5 ms to continuously receive data. The behaviour repeats with a period of 20 ms. During the 5 ms awake period, the mobile device will blind-detect its VoIP data on the semi-persistently allocated resource and also the mobile device will monitor all the CCEs. The base station understands this DRX configuration and will schedule the associated dynamic packets such as RTCP, SIP/SDP, etc, during this 5 ms awake period. In some implementations, when a retransmission occurs, the mobile device will be in continuous mode by default.

The radio manager 14 controls the operation of the wireless access radio 12 such that a reception capability is powered on during the awake periods, and off for at least some of the sleep periods. As described below, it may be necessary for the reception capability to be on during some of the sleep periods to allow for retransmission.

The signalling for dynamic scheduling is performed during the awake periods. In addition, the actual resources allocated for the additional packet transmissions are scheduled to occur during the awake periods.

In some embodiments, when it becomes necessary for a retransmission, the mobile device enters a continuous mode of operation. While in continuous mode, the mobile device continuously receives and monitors the downlink channel and does not turn off reception capability. Further, in some embodiments, if a mixed service needs to be provided to the mobile device, this is used as a trigger to also enable the continuous mode operation. This trigger may be dependent on the traffic QoS of the service being added.

Uplink Semi-Persistent Alignment with Downlink for DRX

Figure 4:
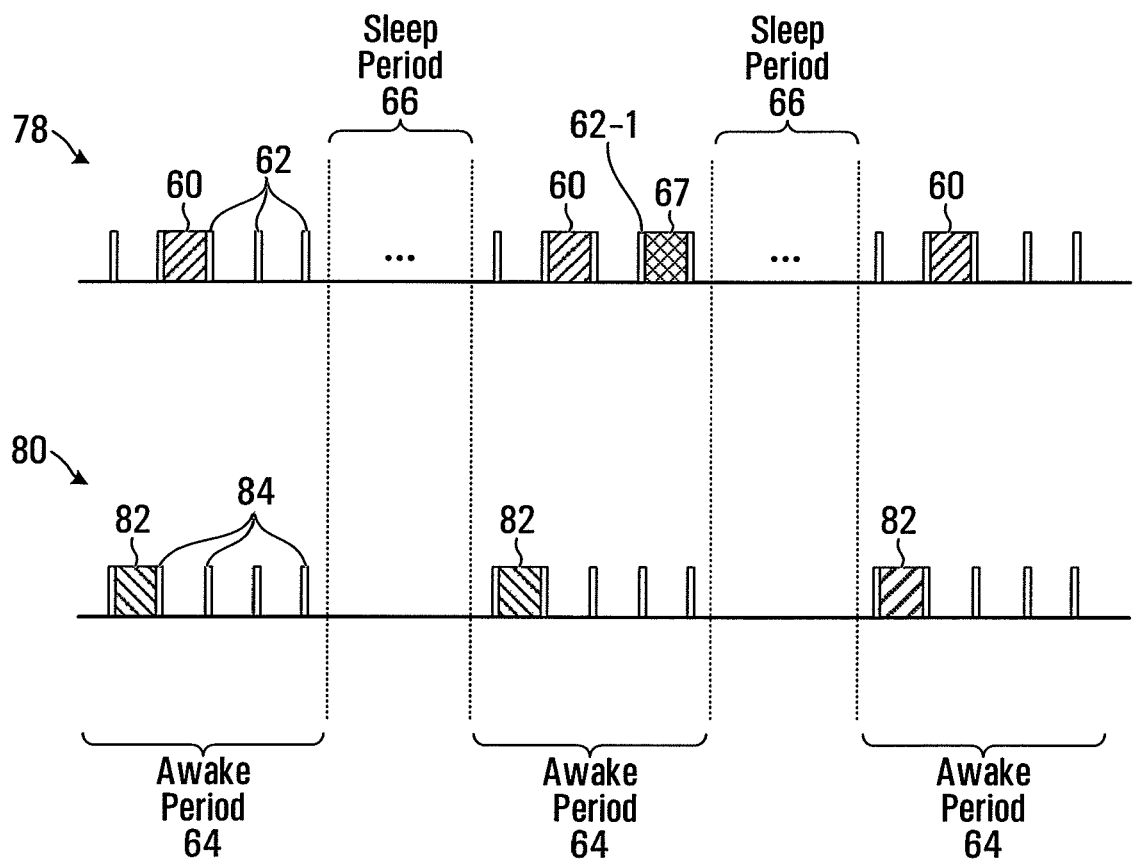
FIG. 4 is a signalling diagram showing DRX and DTX (discontinuous transmission) for uplink and downlink.

The above discussion is focussed on downlink transmission from the base station to the mobile device and on the mobile device's ability to turn off its reception capability during the sleep period. However, some mobile devices are not able to turn off only their reception capability while leaving on a transmit capability or vice versa. Thus, for such devices in order to fully realize the benefit of having an awake period and a sleep period for reception, uplink transmissions should are also scheduled to align with these awake periods and sleep periods. An example of this is shown in FIG. 4. In FIG. 4, the downlink transmission is indicated at 78 and this is basically the same as that described above with reference to FIG. 3, and this will not be described again. The uplink transmissions are generally indicated at 80. Here, there is a semi-persistent allocation 82 for VoIP UL transmissions. These are scheduled to occur during the periods 64 that the mobile device is awake. In addition, an uplink control channel is indicated at 84. In the illustrated example, this occurs every 1 ms. The mobile device only transmits the uplink control channel during the awake periods 64. The mobile device can use the uplink control channel to make requests for additional resources. By scheduling the uplink semi-persistent transmission and downlink semi-persistent transmission to occur during the same awake period, the mobile device can realize much more efficient DRX and DTX (discontinuous reception and discontinuous transmission) behaviour. In the example of FIG. 4, the mobile device is configured to sleep every 15 ms, and then wake up for 5 ms. During this 5 ms awake period, the mobile device will receive DL semi-persistent reception if available (during a DL talk-spurt) and make an uplink semi-persistent transmission if available (during an UL talk-spurt). The mobile device will also detect all the DL grants and possibly make uplink additional resource requests.

In case of retransmissions (either the DL or the UL), the mobile device will enter the continuous mode by default. Note that both the uplink and downlink VoIP semi-persistent allocations have the same traffic characteristics (every 20 ms), hence the base station can easily align the semi-persistent allocation for the DL and UL.

With this approach, even in the active mode (talk-spurt in progress on the uplink or the downlink), the mobile device can be in DRX and DTX mode most of the time. The mobile device monitors the Layer 1 CCEs on the downlink only during the awake period, and may request more resources on the uplink. This can save battery power for the mobile device. Considering that an additional IP packet delivery during a VoIP session may be infrequent, the battery saving could be significant. A drawback is that the dynamic scheduling could be delayed by an additional 10 s on average.

Figure 5:
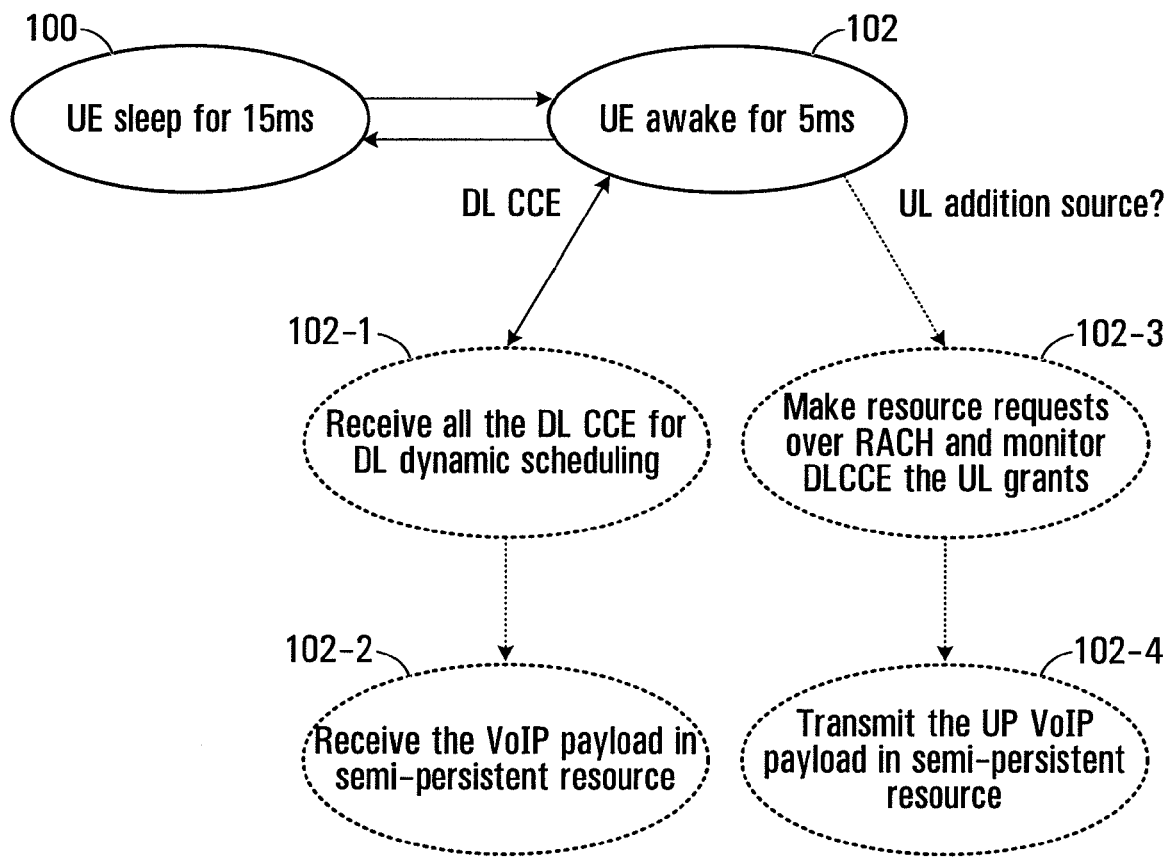
FIG. 5 is a state diagram having DRX and DTX transitions for VoIP.

Referring now to FIG. 5, shown is a state diagram having DRX/DTX state transitions for VoIP. It is noted that when there is no uplink and downlink transmission (i.e. silence in both directions), the mobile device only needs to monitor the DL CCEs for dynamic scheduling during the awake period. There are two main states. The first main state is the UE sleep state 100 and the second main state is the UE awake state 102. For the illustrated example, it is assumed that the sleep state 100 lasts 15 ms and the awake state lasts 5 ms and can be extended, but this is again implementation specific. Blocks 102-1 and 102-2 are executed for downlink communication during the awake state 102. Block 102-1 involves receiving all of the downlink CCEs and processing them to identify downlink dynamic scheduling if present. This is done irrespective of whether or not there is any downlink VoIP transmission. In the event that a downlink talk-spurt is ongoing, then block 102-2 is also executed. This involves receiving the VoIP payload in the semi-persistent resource. Blocks 102-3 and 102-4 are executed in respect of uplink transmissions. 102-3 is only executed if the mobile device determines that it needs a dynamic allocation for uplink transmission. Block 102-3 involves making a resource request, for example over a random access channel, and monitoring the downlink CCE for uplink grants. In addition, if there is an uplink talk-spurt in progress, then the mobile device will execute block 102-4 which involves transmitting the uplink VoIP payload in the semi-persistent resource for uplink transmission.

The above description has focussed on applications where the traffic that is sent using the semi-persistent allocation is VoIP traffic. More generally, the same methods and systems can be applied to combine the transmission and scheduling of traffic of any type on a semi-persistently allocated resource with the transmission and scheduling of traffic that uses dynamic resource allocations.

In the above examples, CCEs spaced by 1 ms are used for the downlink control channel. More generally, the downlink control channel can take any form. The only limitation is that dynamic allocations for a given mobile device take place during awake periods for the mobile device. Similarly, at least in the figures, the uplink control channel has been depicted as a random access channel that is available at intervals spaced by 1 ms. More generally, the uplink control channel for requesting additional resource allocations can come in any form. The only limitation is that requests for dynamic allocations for uplink transmission from a given mobile device will need to be transmitted during awake periods for the mobile device.

In some embodiments, the additional packet is transmitted as a series of one or more sub-packets formed by segmenting the additional packet. These are subject to reassembly at the receiver.

Figure 6:
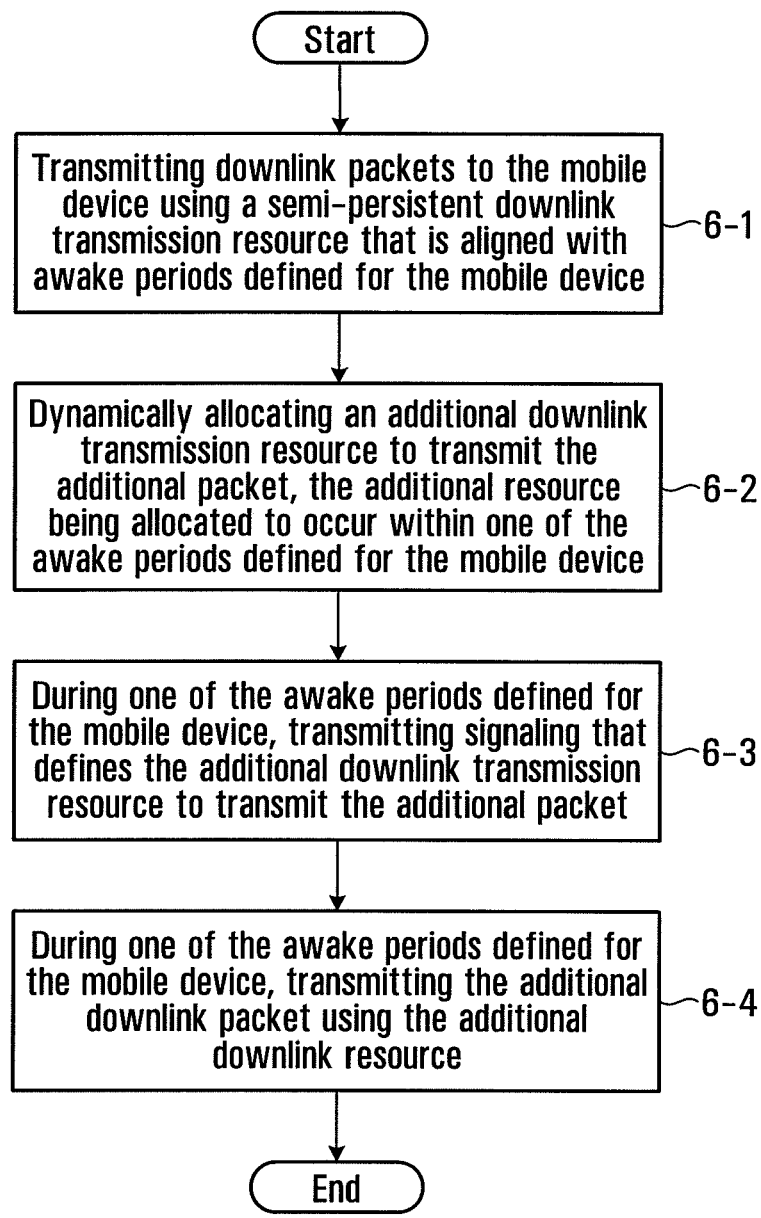
FIGS. 6 and 7 are flowcharts of methods executed by a network to perform combined semi-persistent and dynamic scheduling.
Figure 7:
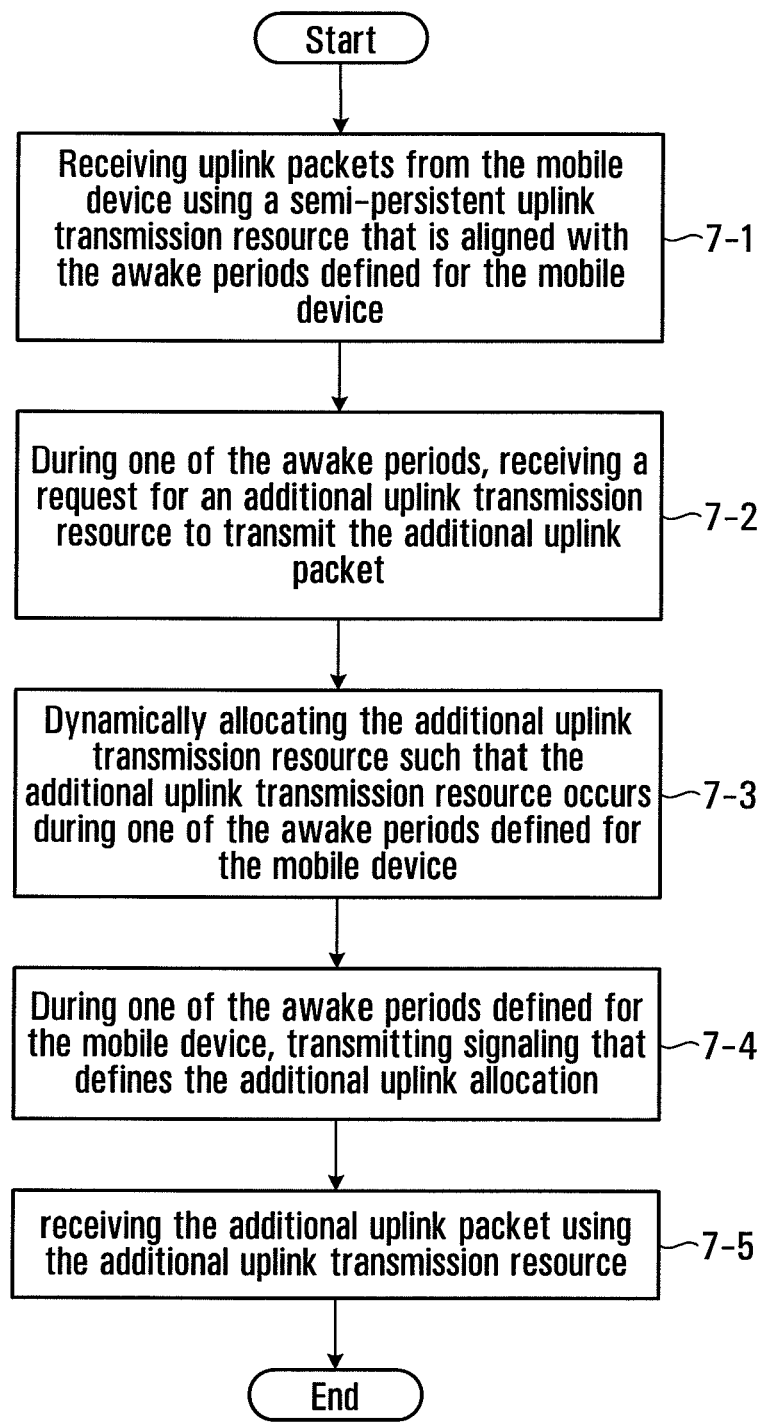

Methods for Semi-Persistent Scheduling and DRX Control Xecuted by the Wireless Network A method in a wireless network for performing downlink transmission to mobile devices will be described with reference to the flowchart of FIG. 6. These blocks are performed for each mobile device being provided wireless access on a semi-persistent downlink transmission resource. The method begins at block 6-1 with transmitting downlink packets to the mobile device using a semi-persistent downlink transmission resource that is aligned with awake periods defined for the mobile device. These can be downlink VoIP packets during a downlink talk-spurt for a VoIP session involving the mobile device or otherwise. Blocks 6-2, 6-3, 6-4 are executed for each additional downlink packet for the mobile device. In block 6-2, the wireless network dynamically allocates an additional downlink transmission resource to transmit the additional packet, the additional resource being allocated to occur within one of the awake periods defined for the mobile device. In block 6-3, during one of the awake periods defined for the mobile device, the wireless network transmits signaling that defines the additional downlink transmission resource to transmit the additional packet. In block 6-4, during one of the awake periods defined for the mobile device, the wireless network transmits the additional downlink packet using the additional downlink resource. In some embodiments, all of the blocks are performed in a base station. In other embodiments, certain blocks, for example the dynamic allocation, can be performed in another network element if centralized scheduling is performed A method in a wireless network for performing uplink reception from mobile devices will be described with reference to the flowchart of FIG. 7. These blocks are performed for each mobile device being provided wireless access on a semi-persistent downlink transmission resource. The method begins with receiving uplink packets from the mobile device using a semi-persistent uplink transmission resource that is aligned with the awake periods defined for the mobile device. These can be VoIP packets during an uplink talk-spurt for a VoIP session involving the mobile device or otherwise. Blocks 7-2, 7-3, 7-4 and 7-5 are performed for each additional each additional uplink packet for the mobile device. In block 7-2, during one of the awake periods, the wireless network receives a request for an additional uplink transmission resource to transmit the additional uplink packet. In block 7-3, the wireless network dynamically allocates the additional uplink transmission resource such that the additional uplink transmission resource occurs during one of the awake periods defined for the mobile device. In block 7-4, during one of the awake periods defined for the mobile device, the wireless network transmits signaling that defines the additional uplink allocation. In block 7-5, the wireless network receives the additional uplink packet using the additional uplink transmission resource.

In some embodiments, the wireless network transmits signaling to each mobile device that defines the awake periods and that defines sleep periods of that mobile device and/or that defines the semi-persistent uplink and/or downlink transmission resource of that mobile device. For VoIP, the signaling to define the semi-persistent resources might be done at the start of each VoIP session. Such signaling can be performed on a channel that is dedicated to each mobile device, or using a broadcast channel containing such signaling for multiple devices.

Figure 8:
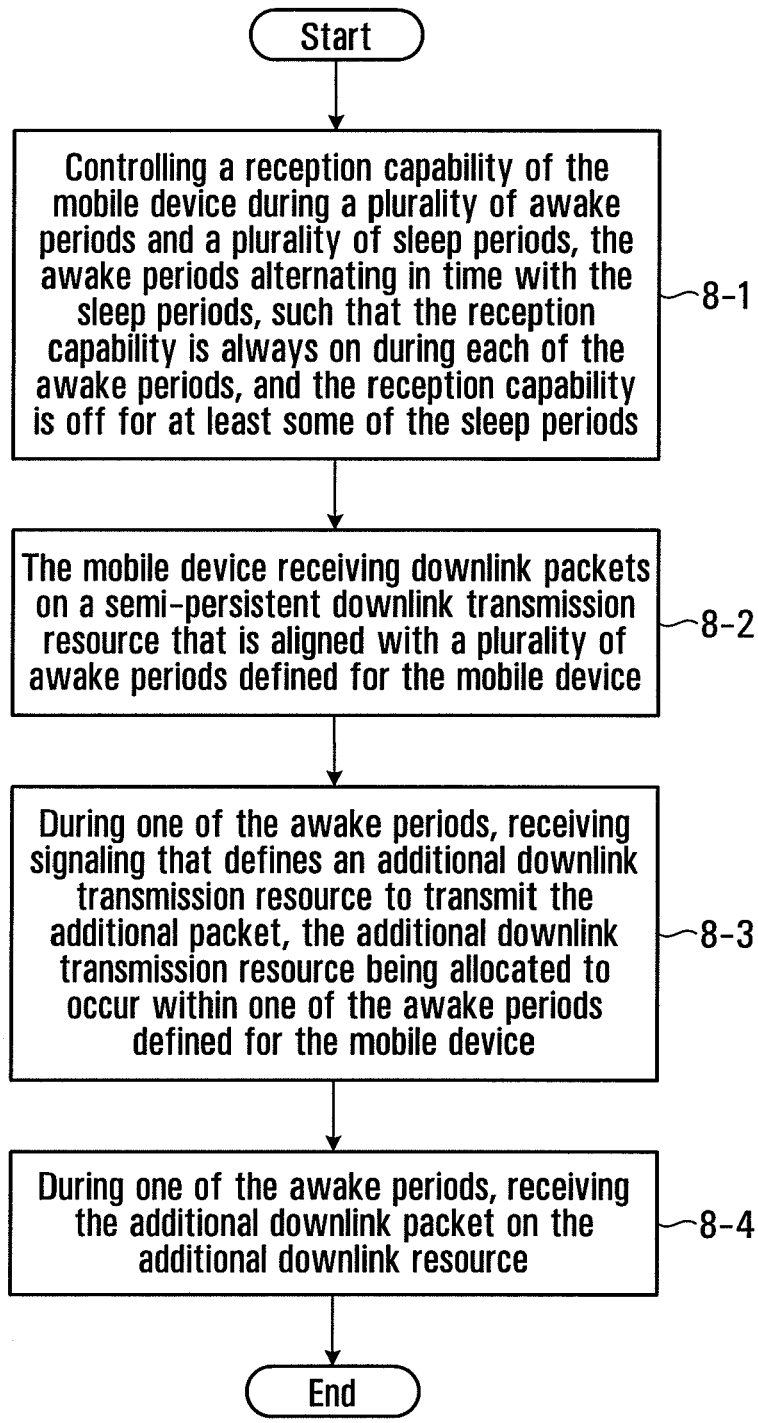
FIG. 8 and 9 are flowcharts of methods executed by a mobile device to perform combined semi-persistent and dynamic scheduling.

Methods for Semi-Persistent Scheduling and DRX Control Xecuted by the Mobile Device Referring now to FIG. 8, a method of receiving downlink transmission executed by a mobile device will now be described. The method begins at block 8-1 with the mobile device controlling a reception capability of the mobile device during a plurality of awake periods and a plurality of sleep periods, the awake periods alternating in time with the sleep periods, such that the reception capability is always on during each of the awake periods, and the reception capability is off for at least some of the sleep periods. On a nominal basis, typically the reception capability will be off for every sleep period. At block 8-2, the mobile device receives downlink packets on a semi-persistent downlink transmission resource that is aligned with a plurality of awake periods defined for the mobile device. These can be VoIP downlink packets during a downlink talk-spurt for a VoIP session involving the mobile device, or otherwise. Blocks 8-3 and 8-4 are performed for each additional downlink packet for the mobile device. In block 8-3, during one of the awake periods, the mobile device receives signaling that defines an additional downlink transmission resource to transmit the additional packet, the additional downlink transmission resource being allocated to occur within one of the awake periods defined for the mobile device. In block 8-4, during one of the awake periods, the mobile device receives the additional downlink packet on the additional downlink resource.

The mobile device may receive signaling that defines the awake periods and the sleep periods of the mobile device and/or that defines the semi-persistent downlink transmission resource of that mobile device. This may take place over a respective dedicated channel for the mobile device or over a broadcast channel containing signaling information for the mobile device and other mobile devices.

Figure 9:
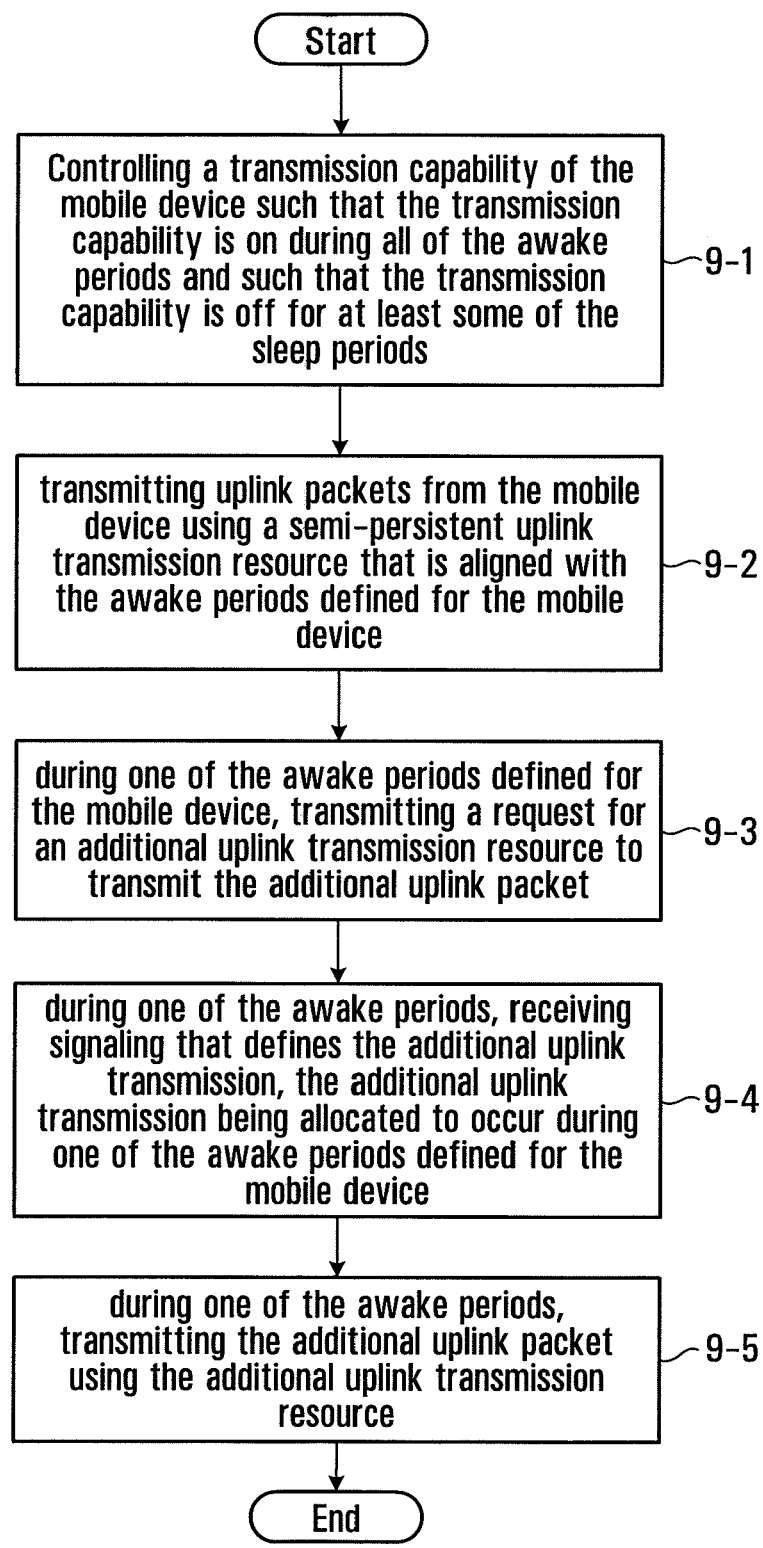

Referring now to FIG. 9, a method of transmitting uplink transmissions executed by a mobile device will now be described. The method begins at block 9-1 with controlling a transmission capability of the mobile device such that the transmission capability is on during all of the awake periods and such that the transmission capability is off for at least some of the sleep periods. In block 9-2, the mobile device transmits uplink packets (VoIP packets or otherwise) using a semi-persistent uplink transmission resource that is aligned with the awake periods defined for the mobile device. Blocks 9-3, 9-4, 9-5 are executed for each additional uplink packet for the mobile device. In block 9-3, during one of the awake periods defined for the mobile device, the mobile device transmits a request for an additional uplink transmission resource to transmit the additional uplink packet. In block 9-4, during one of the awake periods, the mobile device receives signaling that defines the additional uplink transmission resource, the additional uplink transmission resource being allocated to occur during one of the awake periods defined for the mobile device. In block 9-5, during one of the awake periods, the mobile device transmits the additional uplink packet using the additional uplink transmission resource.

The mobile device may receive signaling that defines the semi-persistent uplink resource. In some embodiments, the request for an additional uplink allocation is transmitted using a contention based random access channel.

In some embodiments, mobile devices have radios that feature a transmitter and a receiver. While the radio is on, the receiver capability is on, and the receiver will be actively attempting to process signals received on the mobile device's antenna(s). There is not necessarily content for the given mobile device all the time that the receiver is on, but the receiver is consuming power nonetheless for that time period. In addition, while the radio is on, the mobile device is able to transmit. However, so long as the mobile device does not have something to transmit, there is no active transmission taking place, and as such little or no transmit power consumption occurs until there is an active transmission.

In embodiments referring to NACK/ACK transmission, the particular NACK/ACK scheme employed is implementation specific. Some embodiments employ an ACK only scheme; other embodiments employ a NACK only scheme, while others use both ACKs and NACKs.

DRX Control and NACK/ACK

In some implementations, on the downlink, the time between the DL-SCH (Downlink Shared Channel) reception and the NACK/ACK transmission on the PUCCH (Physical Uplink Control Channel) is fixed. In some embodiments, for the downlink, an inactivity timer is started after reception of a dynamically scheduled packet during a DRX-ON period (DRX-ON period extension). The mobile device keeps its radio on until expiry of the inactivity timer unless another dynamic scheduling takes place before expiry in which case the inactivity timer is restarted. Because of the inactivity timer, there is no problem with transmission of ACK/NACK for dynamically scheduled packets. However, for semi-persistent scheduling (even in systems that feature an inactivity timer as described above), the mobile device will not start an inactivity timer after receiving a downlink transmission on a semi-persistent resource, but rather the mobile device will go to sleep at the end of an on period. Sleeping may not be efficient if the mobile device needs to have its transmitter on quite shortly after the semi-persistent reception in order to transmit a NACK/ACK on the PUCCH.

A. Awake Period Long Enough for ACK/NACK

In some embodiments, the awake period that is aligned with the semi-persistent resource is provisioned to have a duration that is long enough that it also includes times that the mobile device is expected to transmit/receive an ACK/NACK in respect of a transmission on semi-persistent resource allocation for the uplink and/or the downlink. In some cases, the ACK/NACK is transmitted a fixed duration after receiving the semi-persistent resource, for example measured in layer-1 sub-frames. For this embodiment the awake period is configured to always be long enough for the semi-persistent transmission and the following ACK/NACK. For the case where the ACK/NACK transmission follows data reception by 3 ms, the awake window needs to be at least 3 ms longer than the time of reception on the semi-persistent resource plus the time to transmit the ACK/NACK. The particular awake period that achieves this will of course be implementation specific. The configured duration of the awake window is signalled to the mobile device by the network, for example by the eNB.

Figure 11A:
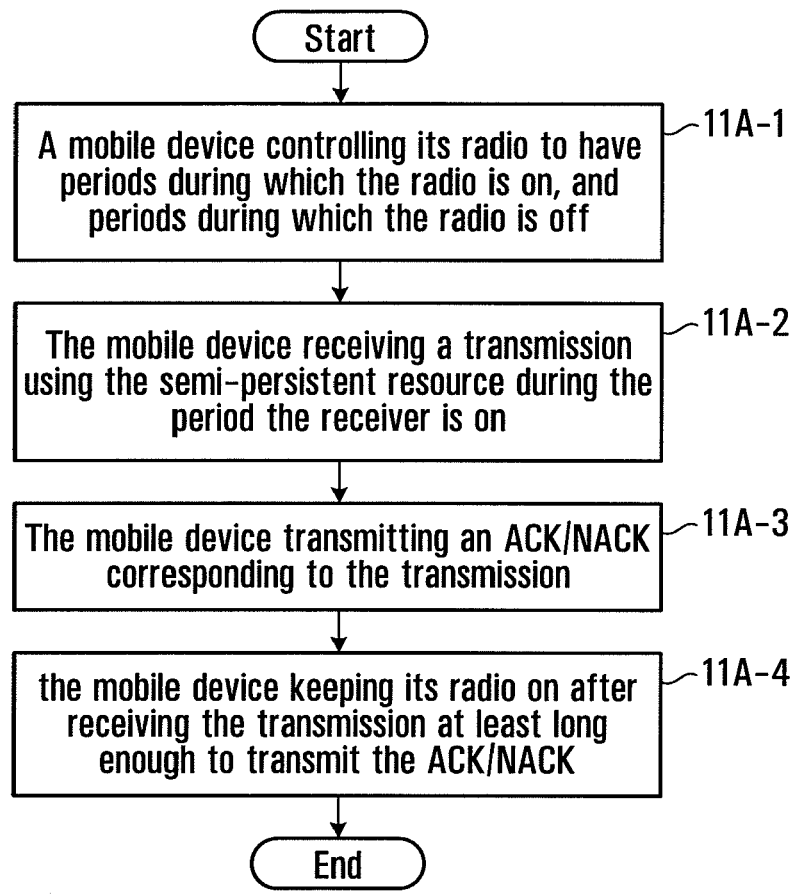
FIGS. 11A to 14 are flowcharts of methods of discontinuous reception control to allow for ACK/NACK transmission.

FIG. 11A is a flowchart of an example of such a method. The method begins at block 11A-1 with a mobile device controlling its radio to have periods during which the radio is on, and periods during which the radio is off. For each period that the radio is on for which there is content to send to the mobile device on a semi-persistent resource, the mobile device performs blocks 11A-2, 11A-3 and 11A-4. In block 11A-2, the mobile device receives a transmission using the semi-persistent resource during the period the receiver is on. In block 11A-3, the mobile device transmits an ACK/NACK corresponding to the transmission. In block 11A-4, the mobile device keeps its radio on after receiving the transmission at least long enough to transmit the ACK/NACK.

In some embodiments, the on periods have a nominal on duration and the off periods have a nominal off duration, the nominal on duration being configured to be long enough for the semi-persistent transmission and corresponding ACK/NACK. The mobile device may receive signalling that configures the nominal on duration.

Figure 11B:
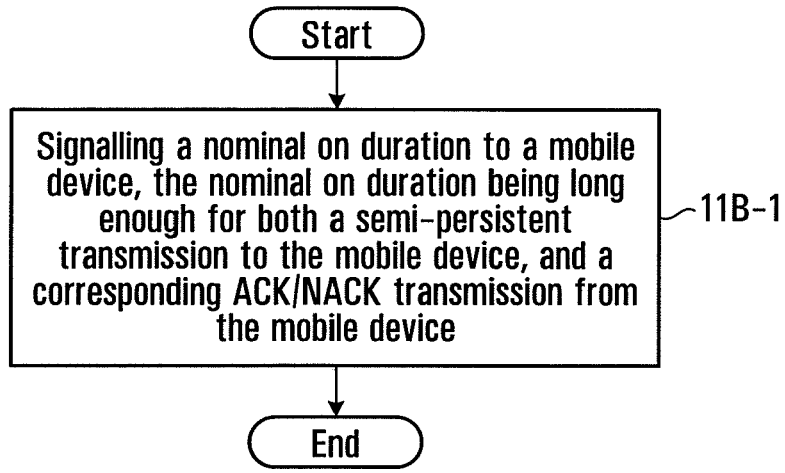

FIG. 11B is a flowchart of an example of such a method from the perspective of the network. At block 11B-1, the network sends signalling to the mobile device that indicates a nominal on duration to the mobile device. The nominal on duration is long enough for both a semi-persistent transmission to the mobile device, and a corresponding ACK/NACK transmission from the mobile device.

FIGS. 11A and 11B are specific to the case where a transmission from the network to the mobile device on a semi-persistent resource is made, and the mobile device has nominal awake periods that are long enough to also make a corresponding ACK/NACK transmission.

In another embodiment, a similar approach is applied for transmissions from the mobile device to the network on a semi-persistent resource; the mobile device has nominal awake periods that are long enough to receive a corresponding ACK/NACK transmission.

In some embodiments, the approach is applied both in respect of transmissions on a semi-persistent resource from the network to the mobile device, as described above, and in respect of transmissions on a semi-persistent resource from the mobile device to the network, as described above. B. Certain Awake Periods Extended for ACK/NACK In some embodiments, where an ACK/NACK is expected (as will be the case when the semi-persistent allocation is active for a given sub-frame), the awake period is extended to allow for this. When no ACK/NACK is expected (as will be the case when the semi-persistent allocation is not active for a given sub-frame), the awake period is not extended.

In some embodiments, the definition of the extension of the awake period is an additional DRX parameter that is signalled to the mobile device during call setup. In other embodiments, the extension to the awake period is simply fixed assuming that the time period between semi-persistent transmission and ACK/NACK transmission is fixed, as in the above example where that time period was 3 ms. In such a case, the mobile device is configured to stay awake nominally for the awake period, and then to stay awake for the awake period plus the extension period in the event the semi-persistent allocation was active for that sub-frame such that an ACK/NACK can be transmitted.

Figure 12A:
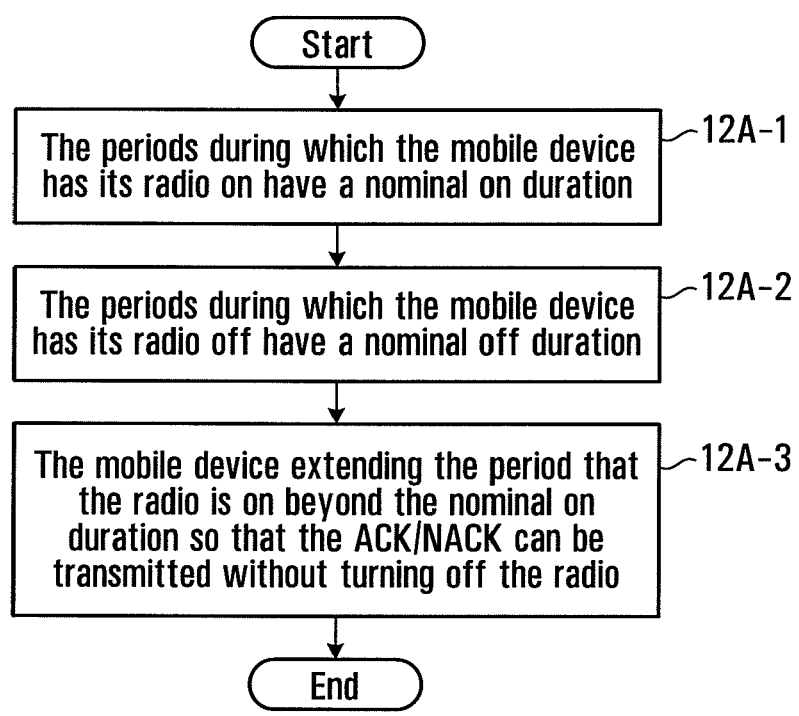

A flowchart of such a method is shown in FIG. 12A. The periods during which the mobile device has its radio on have a nominal on duration (12A-1) and the periods during which the mobile device has its radio off have a nominal off duration (12A-2). The mobile device keeps its radio on after receiving the transmission at least long enough to transmit the ACK/NACK. This involves, for each period that the radio is on for which there is content to send to the mobile device on a semi-persistent resource, the mobile device extending the period that the radio is on beyond the nominal on duration so that the ACK/NACK can be transmitted without turning off the radio (12A-3).

Figure 12B:
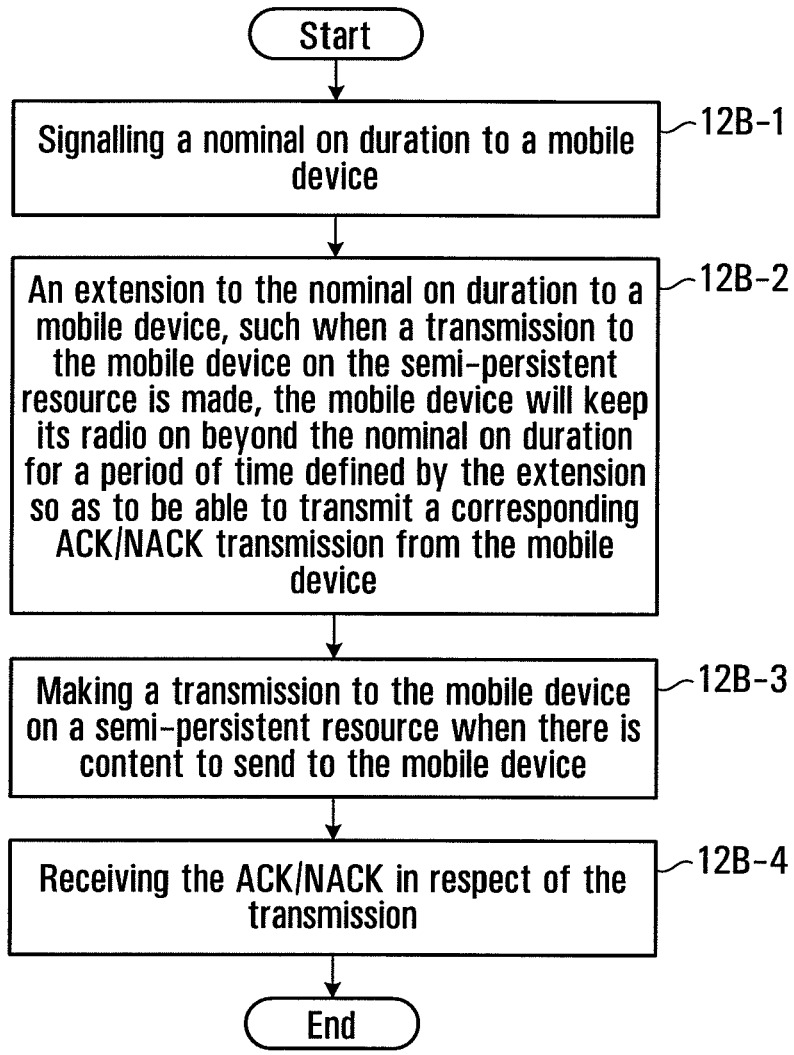

A flowchart of such a method from the perspective of the network is shown in FIG. 12B. In block 12B-1, the network signals to the mobile device a nominal on duration. In block 12B-2, the network signals an extension to the nominal on duration to the mobile device, such when a transmission to the mobile device on the semi-persistent resource is made, the mobile device will keep its radio on beyond the nominal on duration for a period of time defined by the extension so as to be able to transmit a corresponding ACK/NACK transmission from the mobile device. For each period that the mobile device is expected to have its radio on in accordance with the nominal on duration, the network executes blocks 12B-3 and 12B-4. In block 12B-3, the network makes a transmission to the mobile device on a semi-persistent resource when there is content to send to the mobile device. In block 12B-4, the network receives an ACK/NACK in respect of the transmission.

FIGS. 12A and 12B are specific to the case where a transmission from the network to the mobile device on a semi-persistent resource is made, and the mobile device extends an awake period long enough to make a corresponding ACK/NACK transmission.

In another embodiment, a similar approach is applied for transmissions from the mobile device to the network on a semi-persistent resource; the mobile device extends its awake period long enough to receive a corresponding ACK/NACK transmission.

In some embodiments, the approach is applied both in respect of transmissions on a semi-persistent resource from the network to the mobile device, as described above, and in respect of transmissions on a semi-persistent resource from the mobile device to the network, as described above.

C. Additional Awake Periods for ACK/NACK

In another embodiment, additional awake periods are provisioned that are aligned with times that the UE is expected transmit/receive an ACK/NACK. More specifically, in such embodiments, a DRX/DTX period is provisioned between an awake period for a voice packet (semi-persistent resource allocation) and an awake period for the ACK/NACK. In some embodiments, CCEs transmitted during either of the awake periods can be used to signal a dynamic allocation for the uplink and/or downlink. In addition, in some embodiments, during the additional awake period, the mobile device is permitted to make requests for dynamic allocations for the uplink.

A flowchart of an example of such a method will be described with reference to FIG. 13A. In block 13A-1, a mobile device receives signalling that defines a nominal on duration for receiving transmissions on a semi-persistent resource. In block 13A-2, the mobile device receives signalling that defines additional on durations that are aligned with times for transmitting ACK/NACK in response to transmissions on the semi-persistent resource. In block 13A-3, the mobile device controls its radio such that the radio is on for every period having the nominal on duration. For each period that the radio is on, if the mobile device receives a transmission on the semi-persistent resource (yes path, block 13A-4), the mobile device performs blocks 13A-5, and 13A-6. In block 13A-5, the mobile device turns its radio on for an additional on duration in accordance with the signalling that defines the additional on durations. In block 13A-6, the mobile device transmits the ACK/NACK during the additional on duration. For each period that the radio is on, if there is no content to receive by the mobile device on the semi-persistent resource (no path, block 13A-4), the mobile device performs block 13A-7 which involves not turning on its radio on for an additional on duration in accordance with the signalling that defines the additional on durations.

A flowchart of an example of such a method from the network perspective will now be described with reference to FIG. 13B. In block 13B-1, the network transmits signalling that defines a nominal on duration for receiving transmissions on a semi-persistent resource. In block 13B-2, the network transmits signalling that defines additional on durations that are aligned with times for transmitting ACK/NACK in response to transmissions on the semi-persistent resource. Blocks 13B-3 and 13B-4 are executed for each period that the mobile device is expected to have its radio on in accordance with signalling that defines the nominal on duration for which there is content to send to the mobile device on the semi-persistent resource. In block 13B-3, the network sends a transmission using the semi-persistent resource. In block 13B-4, the network receives an ACK/NACK during an additional on duration.

Figure 13A:
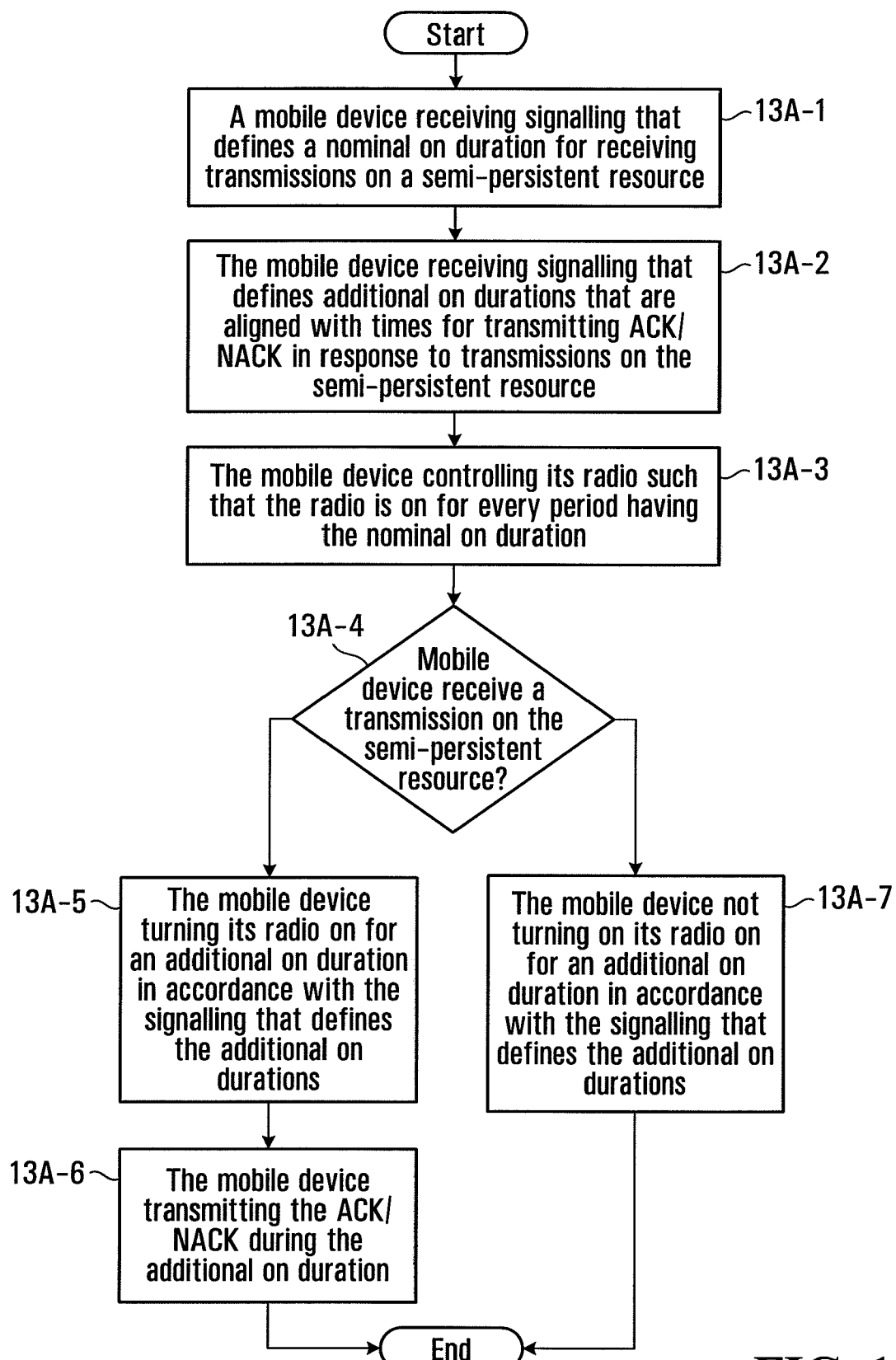
Figure 13B:
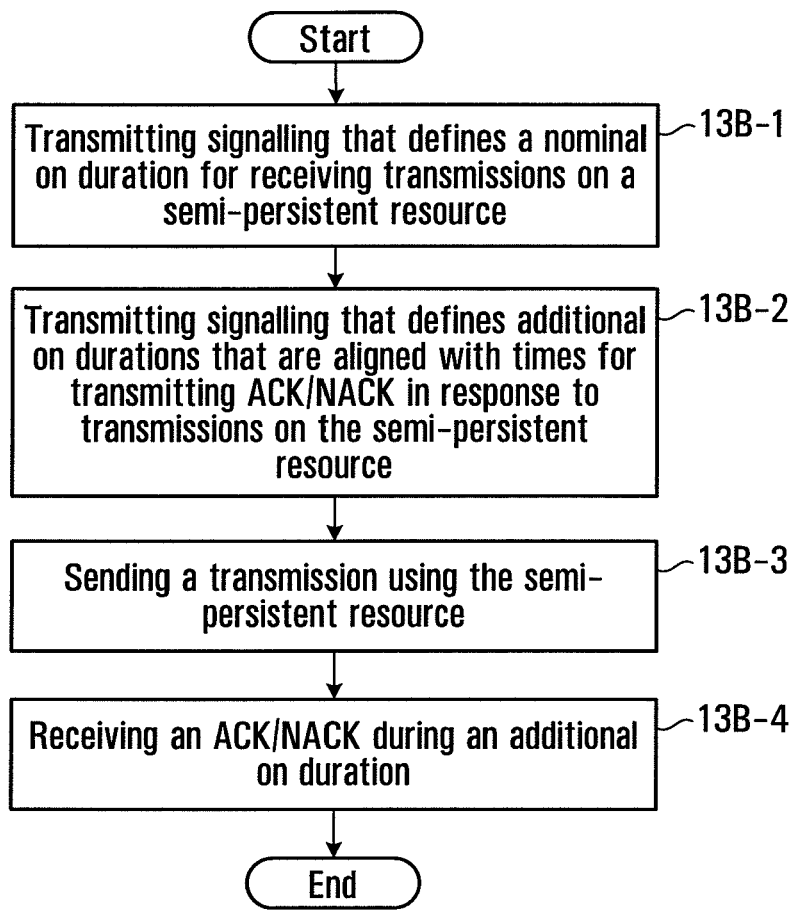

FIGS. 13A and 13B are specific to the case where a transmission from the network to the mobile device on a semi-persistent resource is made, and the mobile device turns its radio for an additional on period to make a corresponding ACK/NACK transmission.

In another embodiment, a similar approach is applied for transmissions from the mobile device to the network on a semi-persistent resource; the mobile device keeps turns its radio on for an additional on period to receive a corresponding ACK/NACK transmission.

In some embodiments, the approach is applied both in respect of transmissions on a semi-persistent resource from the network to the mobile device, as described above, and in respect of transmissions on a semi-persistent resource from the mobile device to the network, as described above.

D. ACK/NACK Transmission Irrespective of DRX Behaviour

In some embodiments, the mobile device transmits and/or receives ACK/NACKs irrespective of the DRX behaviour that would otherwise take place in the mobile device. The mobile device wakes up at the predefined ACK/NACK interval for uplink ACK/NACK transmission and/or downlink ACK/NACK reception.

Figure 14:
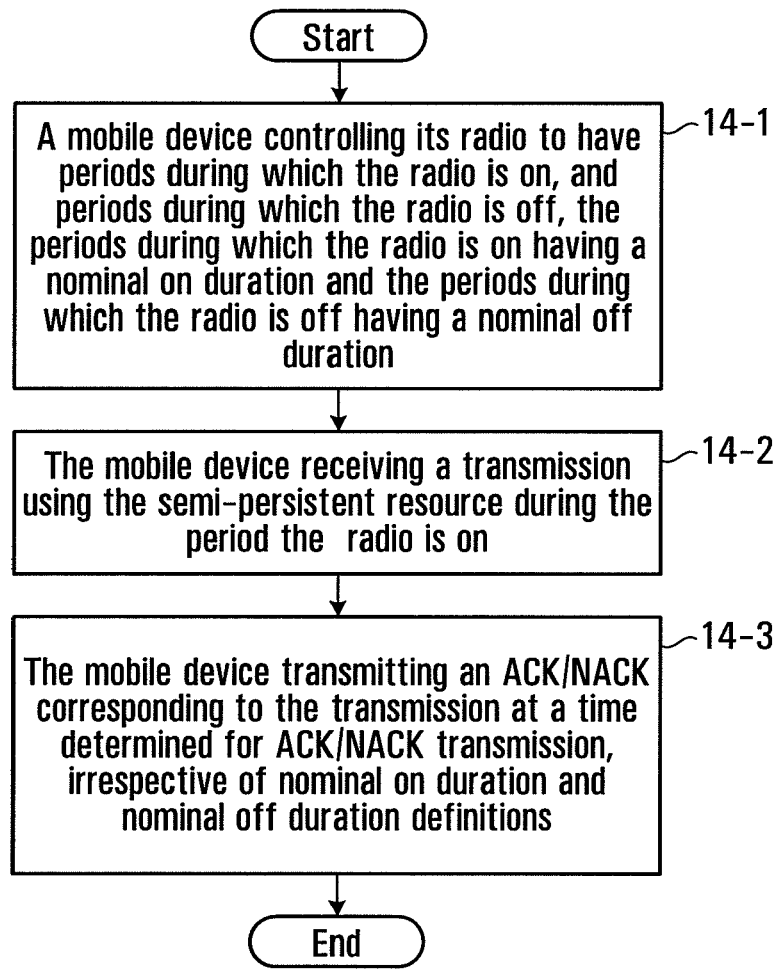

A flowchart of an example of such a method is shown in FIG. 14. The method beings with block 14-1 which involves a mobile device controlling its radio to have periods during which the radio is on, and periods during which the radio is off, the periods during which the radio is on having a nominal on duration and the periods during which the radio is off having a nominal off duration. For each period that the radio is on for which there is content to send to the mobile device on a semi-persistent resource, the mobile device performs blocks 14-2 and 14-3. In block 14-2, the mobile device receives a transmission using the semi-persistent resource during the period the radio is on. In block 14-3, the mobile device transmits an ACK/NACK corresponding to the transmission at a time determined for ACK/NACK transmission irrespective of nominal on duration and nominal off duration definitions. This will involve turning on the radio at the time determined for ACK/NACK transmission if it is not already on.

FIG. 14 is specific to the case where a transmission from the network to the mobile device on a semi-persistent resource is made, and the mobile device turns its radio on to make a corresponding ACK/NACK transmission, irrespective of nominal on period and nominal off duration definitions.

In another embodiment, a similar approach is applied for transmissions from the mobile device to the network on a semi-persistent resource; the mobile device turns its radio on to receive a corresponding ACK/NACK transmission irrespective of nominal on period and nominal off duration definitions.

In some embodiments, the approach is applied both in respect of transmissions on a semi-persistent resource from the network to the mobile device, as described above, and in respect of transmissions on a semi-persistent resource from the mobile device to the network, as described above.

Figure 10:
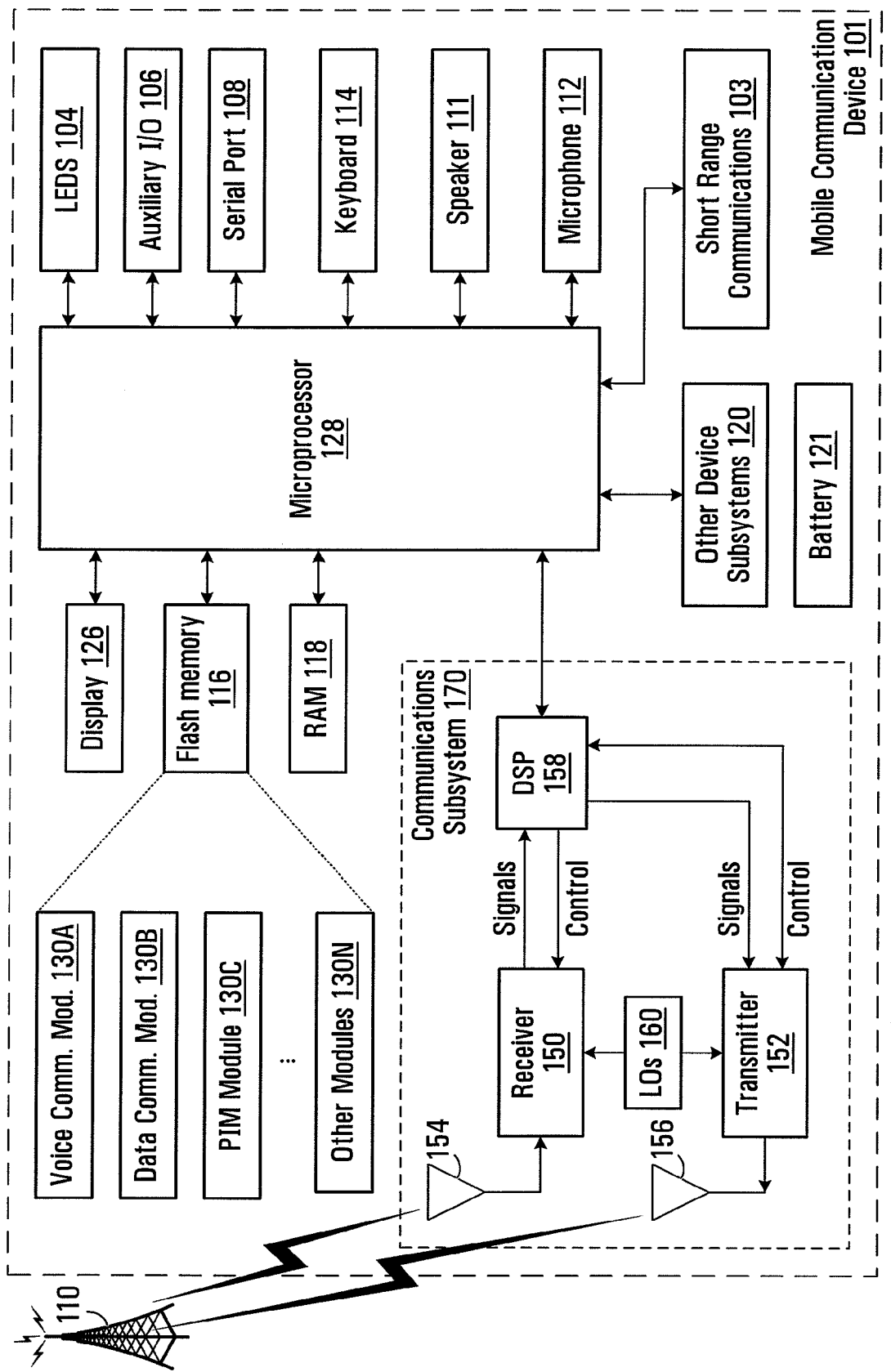
FIG. 10 is a block diagram of a mobile device.

As described above, various mechanisms are provided to allow the mobile device to have its radio on for ACK/NACK transmission/reception. The mobile device will have its radio on for each such period in the event an ACK/NACK in respect of a communication is possible. The ACK/NACK is a transmission by the mobile device if the communication was a downlink transmission; the ACK/NACK is a reception by the mobile device if the communication was an uplink transmission. Another Mobile Device Referring now to FIG. 10, shown is a block diagram of another mobile device that may implement any of the mobile device methods described herein. The mobile device 101 is shown with specific components for implementing features similar to those of the mobile device 10 of FIG. 2. It is to be understood that the mobile device 101 is shown with very specific details for example purposes only.

A processing device (a microprocessor 128) is shown schematically as coupled between a keyboard 114 and a display 126. The microprocessor 128 may be a specific example of the processor with features similar to those of the processor 16 of the mobile device 10 shown in FIG. 2. The microprocessor 128 controls operation of the display 126, as well as overall operation of the mobile device 101, in response to actuation of keys on the keyboard 114 by a user.

The mobile device 101 has a housing that may be elongated vertically, or may take on other sizes and shapes (including clamshell housing structures). The keyboard 114 may include a mode selection key, or other hardware or software for switching between text entry and telephony entry.

In addition to the microprocessor 128, other parts of the mobile device 101 are shown schematically. These include: a communications subsystem 170; a short-range communications subsystem 103; the keyboard 114 and the display 126, along with other input/output devices including a set of LEDs 104, a set of auxiliary I/O devices 106, a serial port 108, a speaker 111 and a microphone 112; as well as memory devices including a flash memory 116 and a Random Access Memory (RAM) 118; and various other device subsystems 120. The mobile device 101 may have a battery 121 to power the active elements of the mobile device 101. The mobile device 101 is in some embodiments a two-way radio frequency (RF) communication device having voice and data communication capabilities. In addition, the mobile device 101 in some embodiments has the capability to communicate with other computer systems via the Internet.

Operating system software executed by the microprocessor 128 is in some embodiments stored in a persistent store, such as the flash memory 116, but may be stored in other types of memory devices, such as a read only memory (ROM) or similar storage element. In addition, system software, specific device applications, or parts thereof, may be temporarily loaded into a volatile store, such as the RAM 118. Communication signals received by the mobile device 101 may also be stored to the RAM 118.

The microprocessor 128, in addition to its operating system functions, enables execution of software applications on the mobile device 101. A predetermined set of software applications that control basic device operations, such as a voice communications module 130A and a data communications module 130B, may be installed on the mobile device 101 during manufacture. In addition, a personal information manager (PIM) application module 130C may also be installed on the mobile device 101 during manufacture. The PIM application is in some embodiments capable of organizing and managing data items, such as e-mail, calendar events, voice mails, appointments, and task items. The PIM application is also in some embodiments capable of sending and receiving data items via a wireless network 110. In some embodiments, the data items managed by the PIM application are seamlessly integrated, synchronized and updated via the wireless network 110 with the device user's corresponding data items stored or associated with a host computer system. As well, additional software modules, illustrated as another software module 130N, may be installed during manufacture. One or more of the modules 130A,130B,130C,130N of the flash memory 116 can be configured for implementing features similar to those of the radio manager 14 of the mobile device 10 shown in FIG. 2.

Communication functions, including data and voice communications, are performed through the communication subsystem 170, and possibly through the short-range communications subsystem 103. The communication subsystem 170 includes a receiver 150, a transmitter 152 and one or more antennas, illustrated as a receive antenna 154 and a transmit antenna 156. In addition, the communication subsystem 170 also includes a processing module, such as a digital signal processor (DSP) 158, and local oscillators (LOs) 160. The communication subsystem 170 having the transmitter 152 and the receiver 150 is an implementation of a specific example of the wireless access radio 12 of the mobile device 10 shown in FIG. 2. The specific design and implementation of the communication subsystem 170 is dependent upon the communication network in which the mobile device 101 is intended to operate. For example, the communication subsystem 170 of the mobile device 101 may be designed to operate with the Mobitex™, DataTAC™ or General Packet Radio Service (GPRS) mobile data communication networks and also designed to operate with any of a variety of voice communication networks, such as Advanced Mobile Phone Service (AMPS), Time Division Multiple Access (TDMA), Code Division Multiple Access (CDMA), Personal Communications Service (PCS), Global System for Mobile Communications (GSM), etc. The communication subsystem 170 may also be designed to operate with an 802.11 Wi-Fi network, and/or an 802.16 WiMAX network. Other types of data and voice networks, both separate and integrated, may also be utilized with the mobile device 101.

Network access may vary depending upon the type of communication system. For example, in the Mobitex™ and DataTAC™ networks, mobile devices are registered on the network using a unique Personal Identification Number (PIN) associated with each device. In GPRS networks, however, network access is typically associated with a subscriber or user of a device. A GPRS device therefore typically has a subscriber identity module, commonly referred to as a Subscriber Identity Module (SIM) card, in order to operate on a GPRS network.

When network registration or activation procedures have been completed, the mobile device 101 may send and receive communication signals over the communication network 110. Signals received from the communication network 110 by the receive antenna 154 are routed to the receiver 150, which provides for signal amplification, frequency down conversion, filtering, channel selection, etc., and may also provide analog to digital conversion. Analog-to-digital conversion of the received signal allows the DSP 158 to perform more complex communication functions, such as demodulation and decoding. In a similar manner, signals to be transmitted to the network 110 are processed (e.g., modulated and encoded) by the DSP 158 and are then provided to the transmitter 152 for digital to analog conversion, frequency up conversion, filtering, amplification and transmission to the communication network 110 (or networks) via the transmit antenna 156.

In addition to processing communication signals, the DSP 158 provides for control of the receiver 150 and the transmitter 152. For example, gains applied to communication signals in the receiver 150 and the transmitter 152 may be adaptively controlled through automatic gain control algorithms implemented in the DSP 158.

In a data communication mode, a received signal, such as a text message or web page download, is processed by the communication subsystem 170 and is input to the microprocessor 128. The received signal is then further processed by the microprocessor 128 for an output to the display 126, or alternatively to some other auxiliary I/O devices 106. A device user may also compose data items, such as e-mail messages, using the keyboard 114 and/or some other auxiliary I/O device 106, such as a touchpad, a rocker switch, a thumb-wheel, or some other type of input device. The composed data items may then be transmitted over the communication network 110 via the communication subsystem 170.

In a voice communication mode, overall operation of the device is substantially similar to the data communication mode, except that received signals are output to a speaker 111, and signals for transmission are generated by a microphone 112. Alternative voice or audio I/O subsystems, such as a voice message recording subsystem, may also be implemented on the mobile device 101. In addition, the display 126 may also be utilized in voice communication mode, for example, to display the identity of a calling party, the duration of a voice call, or other voice call related information.

The short-range communications subsystem 103 enables communication between the mobile device 101 and other proximate systems or devices, which need not necessarily be similar devices. For example, the short-range communications subsystem may include an infrared device and associated circuits and components, or a Bluetooth™ communication module to provide for communication with similarly-enabled systems and devices.

Numerous modifications and variations of the present application are possible in light of the above teachings. It is therefore to be understood that within the scope of the appended claims, the application may be practised otherwise than as specifically described herein.

The invention claimed is:

1. A method of receiving acknowledgement [ACK] or negative-acknowledgement [NACK] in a device comprising:
    configuring the device for discontinuous reception [DRX] having at least one awake period and at least one sleep period such that a receiver of the device is always on during the awake period, and the receiver of the device is on for at least some portion of the sleep period following the awake period; and
    receiving ACK or NACK information during the sleep period when the device is configured not to monitor Layer 1 for Channel Control Elements [CCEs].

2. A method of transmitting acknowledgement [ACK] or negative-acknowledgement [NACK] in a device comprising:
    configuring the device for discontinuous reception [DRX] having at least one awake period and at least one sleep period such that a receiver of the device is always on during the awake period, and the receiver of the device is on for at least some portion of the sleep period following the awake period; and
    transmitting ACK or NACK information during the sleep period when the device is configured not to monitor Layer 1 for Channel Control Elements [CCEs].

3. A wireless device comprising:
    a receiver configured for discontinuous reception [DRX] having at least one awake period and at least one sleep period such that the receiver is always on during the awake period, and the receiver is on for at least some portion of the sleep period following the awake period; and
    the receiver further configured to receive acknowledgement [ACK] or negative-acknowledgement [NACK] information during the sleep period when the device is configured not to monitor Layer 1 for Channel Control Elements [CCEs].

4. A wireless device comprising:
    a receiver configured for discontinuous reception [DRX] having at least one awake period and at least one sleep period such that the receiver is always on during the awake period, and the receiver is one for at least some portion of the sleep period following the awake period; and
    a transmitter configured to transmit acknowledgement [ACK] or negative-acknowledgement [NACK] information during the sleep period when the device is configured not to monitor Layer 1 for Channel Control Elements [CCEs].

5. A method in a wireless device having a radio, the method comprising:
    controlling the radio to have on and off periods during which the radio is on, and off, respectively, the periods during which the radio is on having a nominal on duration and the periods during which the radio is off having a nominal on duration when the device is configured not to monitor Layer 1 for Channel Control Elements [CCEs];

receiving a transmission during a period the radio is on;

transmitting an acknowledgment [ACK] or negative-acknowledgment [NACK] corresponding to the transmission at a time determined for ACK or NACK transmission, without regard to whether the radio is otherwise in an off period.

6. The method of claim 5 further comprising:

making uplink transmissions;

receiving any expected ACK or NACK in respect of uplink transmissions, without regard to whether the radio is otherwise controlled in an off period.

\* \* \* \* \*

UNITED STATES PATENT AND TRADEMARK OFFICE
CERTIFICATE OF CORRECTION

PATENT NO. : 8,483,624 B2
APPLICATION NO. : 12/193991
DATED : July 9, 2013
INVENTOR(S) : Zhijun Cai et al.

It is certified that error appears in the above-identified patent and that said Letters Patent is hereby corrected as shown below:

In the Specification

Col. 1, Line 17, "scheduling, for" should read as --scheduling for--.

Col. 3, Line 47, "in the" should read as --the--.

Col. 6, Line 16-17, "for such devices in order to" should read as -- in order for such devices to--.

Col. 6, Line 19, "should are" should read as --are--.

Col. 7, Line 45, "Xecuted" should read as --Executed--.

Col. 8, Line 42, "Xecuted" should read as --Executed--.

Col. 10, Line 66-67, Insert Paragraph break between "above." and "B."

Col. 13, Lines 46-47, Insert Paragraph break between "transmission." and "Another".

In the Claims

Claim 4, Col. 16, Line 54, "one" should read as --on--.

Claim 5, Col. 16, Line 65, "on, and off" should read as --on and off--.

Signed and Sealed this
Third Day of September, 2013

Teresa Stanek Rea
*Acting Director of the United States Patent and Trademark Office*